(12) United States Patent
Ahn et al.

(10) Patent No.: US 11,716,424 B2
(45) Date of Patent: Aug. 1, 2023

(54) VIDEO CALL MEDIATION METHOD

(71) Applicant: HYPERCONNECT INC., Seoul (KR)

(72) Inventors: Sangil Ahn, Cheongju-si (KR); Kangsik Jung, Seoul (KR); Hyountaek Yong, Seoul (KR)

(73) Assignee: Hyperconnect Inc., Seoul (KR)

( * ) Notice: Subject to any disclaimer, the term of this patent is extended or adjusted under 35 U.S.C. 154(b) by 174 days.

(21) Appl. No.: 16/869,983

(22) Filed: May 8, 2020

(65) Prior Publication Data

US 2020/0358904 A1    Nov. 12, 2020

(30) Foreign Application Priority Data

May 10, 2019    (KR) .......................... 10-2019-0054670

(51) Int. Cl.
| | | |
|---|---|---|
| *H04N 7/15* | (2006.01) | |
| *H04L 51/212* | (2022.01) | |
| *H04M 3/56* | (2006.01) | |
| *G10L 25/63* | (2013.01) | |
| *G10L 25/66* | (2013.01) | |

(Continued)

(52) U.S. Cl.
CPC .......... *H04M 3/567* (2013.01); *G06V 40/164* (2022.01); *G06V 40/176* (2022.01); *G06V 40/23* (2022.01); *G06V 40/28* (2022.01); *G10L 25/63* (2013.01); *G10L 25/66* (2013.01)

(58) Field of Classification Search
CPC .......................... H04M 3/567; H04N 7/14–157
See application file for complete search history.

(56) References Cited

U.S. PATENT DOCUMENTS

| 6,590,601 B2 | 7/2003 | Sukeno et al. |
| 7,321,384 B1 | 1/2008 | Wu et al. |

(Continued)

FOREIGN PATENT DOCUMENTS

| EP | 2515526 A2 | 10/2012 |
| EP | 2782326 A2 | 9/2014 |

(Continued)

OTHER PUBLICATIONS

"Talking to Complete Strangers on Holla App! Awkward" (i.e., Vid0), Published Jul. 21, 2018, Available online at <https://www.youtube.com/watch?v=F9ddBJ4yJZA>.*

(Continued)

*Primary Examiner* — Brian T Pendleton
*Assistant Examiner* — Frank Johnson
(74) *Attorney, Agent, or Firm* — KPPB LLP

(57) ABSTRACT

A video call mediation method of a system may include receiving, by a server, a mediation request, from a plurality of mobiles, mediating, by the server, a first mobile and a second mobile, of the plurality of mobiles, establishing, by the first mobile and the second mobile, a video call session, receiving, by the first mobile, a video, from the second mobile, through the video call session, detecting, by the first mobile, a certain input, reporting, by the first mobile, a video received in the server, in response to the certain input, ending, by the first mobile, the video call session with the second mobile, and establishing, by the first mobile, a video call session with a third mobile, and verifying, by the server, the reporting, and rejecting, by the server, additional mediation request of the second mobile.

20 Claims, 8 Drawing Sheets

(51) Int. Cl.
*G06V 40/20* (2022.01)
*G06V 40/16* (2022.01)

(56) References Cited

U.S. PATENT DOCUMENTS

| | | | |
|---|---|---|---|
| 7,444,403 B1 * | 10/2008 | Packer | H04L 67/535 |
| | | | 709/224 |
| 7,564,476 B1 | 7/2009 | Coughlan et al. | |
| 8,165,416 B2 | 4/2012 | Cutler | |
| 8,441,356 B1 * | 5/2013 | Tedesco | G08B 21/0453 |
| | | | 340/573.1 |
| 8,626,879 B2 | 1/2014 | Dham et al. | |
| 8,826,322 B2 | 9/2014 | Bliss et al. | |
| 8,856,165 B1 | 10/2014 | Cierniak | |
| 8,977,063 B2 | 3/2015 | Lee et al. | |
| 9,225,897 B1 | 12/2015 | Sehn | |
| 9,230,328 B1 | 1/2016 | Wotzlaw | |
| 9,282,287 B1 | 3/2016 | Marsh | |
| 9,319,632 B2 | 4/2016 | Kim et al. | |
| 9,380,264 B1 | 6/2016 | Vakalapudi | |
| 9,460,340 B2 | 10/2016 | Kauffmann et al. | |
| 9,503,456 B1 | 11/2016 | Lindberg et al. | |
| 9,569,697 B1 | 2/2017 | Mcnerney et al. | |
| 9,591,261 B2 | 3/2017 | Suzuki et al. | |
| 9,716,599 B1 * | 7/2017 | Gates | G06V 40/20 |
| 9,848,167 B1 | 12/2017 | Christian et al. | |
| 10,021,344 B2 * | 7/2018 | Farrell | H04N 7/15 |
| 10,084,988 B2 | 9/2018 | Farrell et al. | |
| 10,574,941 B2 | 2/2020 | Ahn et al. | |
| 10,791,261 B2 | 9/2020 | Oyman et al. | |
| 10,855,933 B2 | 12/2020 | Ahn et al. | |
| 10,965,907 B2 | 3/2021 | Ahn et al. | |
| 11,080,325 B2 | 8/2021 | Ahn et al. | |
| 11,102,450 B2 | 8/2021 | Ahn et al. | |
| 11,140,356 B2 | 10/2021 | Ahn et al. | |
| 11,184,582 B2 | 11/2021 | Ahn et al. | |
| 11,206,362 B2 | 12/2021 | Ahn | |
| 11,252,374 B1 | 2/2022 | Lichtenberg et al. | |
| 11,323,659 B2 | 5/2022 | Ahn et al. | |
| 11,394,922 B2 | 7/2022 | Ahn et al. | |
| 11,496,709 B2 | 11/2022 | Ahn et al. | |
| 2003/0028875 A1 | 2/2003 | Piotrowski | |
| 2003/0091239 A1 | 5/2003 | Imagawa et al. | |
| 2003/0126267 A1 | 7/2003 | Gutta et al. | |
| 2004/0049780 A1 | 3/2004 | Gee | |
| 2007/0195158 A1 | 8/2007 | Kies | |
| 2008/0012935 A1 | 1/2008 | Echtenkamp | |
| 2008/0059198 A1 * | 3/2008 | Maislos | G06F 16/9535 |
| | | | 707/E17.109 |
| 2008/0259154 A1 | 10/2008 | Garrison et al. | |
| 2008/0294439 A1 | 11/2008 | Kirby | |
| 2008/0298571 A1 | 12/2008 | Kurtz et al. | |
| 2009/0041311 A1 | 2/2009 | Hundley | |
| 2009/0049467 A1 | 2/2009 | Robson et al. | |
| 2009/0219146 A1 * | 9/2009 | Vandenburgh | H04L 51/224 |
| | | | 340/286.02 |
| 2009/0288131 A1 | 11/2009 | Kandekar et al. | |
| 2010/0017818 A1 | 1/2010 | Joshi et al. | |
| 2010/0054592 A1 | 3/2010 | Nanu et al. | |
| 2010/0124941 A1 | 5/2010 | Cho | |
| 2010/0175129 A1 * | 7/2010 | Doddy | G06Q 10/06 |
| | | | 726/22 |
| 2010/0226261 A1 | 9/2010 | Piché | |
| 2011/0184982 A1 * | 7/2011 | Adamousky | G06F 21/552 |
| | | | 707/769 |
| 2012/0155759 A1 | 6/2012 | Kang et al. | |
| 2012/0182379 A1 | 7/2012 | Ding | |
| 2012/0320141 A1 | 12/2012 | Bowen et al. | |
| 2013/0083155 A1 | 4/2013 | Andresen | |
| 2013/0147897 A1 | 6/2013 | Ichimura et al. | |
| 2013/0234826 A1 | 9/2013 | Sekiguchi et al. | |
| 2013/0342633 A1 | 12/2013 | Ikeda et al. | |
| 2014/0176732 A1 | 6/2014 | Cohen et al. | |
| 2014/0267583 A1 | 9/2014 | Zhu et al. | |
| 2015/0030314 A1 | 1/2015 | Skarakis | |
| 2015/0070516 A1 * | 3/2015 | Shoemake | H04N 21/4542 |
| | | | 348/207.11 |
| 2015/0220777 A1 | 8/2015 | Kauffmann et al. | |
| 2015/0229882 A1 | 8/2015 | Liu | |
| 2015/0286858 A1 * | 10/2015 | Shaburov | G06V 20/64 |
| | | | 382/103 |
| 2015/0325023 A1 | 11/2015 | Gross | |
| 2015/0370474 A1 | 12/2015 | Belaunde et al. | |
| 2016/0019412 A1 | 1/2016 | Kang et al. | |
| 2016/0023116 A1 * | 1/2016 | Wire | A63F 13/71 |
| | | | 463/16 |
| 2016/0034786 A1 | 2/2016 | Suri et al. | |
| 2016/0127653 A1 | 5/2016 | Lee et al. | |
| 2016/0316265 A1 | 10/2016 | Gopalan et al. | |
| 2016/0350675 A1 | 12/2016 | Laks et al. | |
| 2016/0373571 A1 | 12/2016 | Woolsey et al. | |
| 2017/0061248 A1 | 3/2017 | Ryan, Jr. et al. | |
| 2017/0251336 A1 | 8/2017 | Keller | |
| 2017/0289624 A1 | 10/2017 | Avila et al. | |
| 2017/0339081 A1 * | 11/2017 | Beust | H04L 51/04 |
| 2018/0027042 A1 | 1/2018 | Kim | |
| 2018/0103234 A1 | 4/2018 | Ahn et al. | |
| 2018/0176641 A1 | 6/2018 | Yun et al. | |
| 2018/0213364 A1 * | 7/2018 | Segal | H04L 51/222 |
| 2018/0260577 A1 | 9/2018 | Adams et al. | |
| 2018/0309801 A1 * | 10/2018 | Rathod | H04L 67/141 |
| 2018/0316892 A1 | 11/2018 | Jeong et al. | |
| 2018/0335908 A1 | 11/2018 | Kim et al. | |
| 2019/0188453 A1 | 6/2019 | Ahn et al. | |
| 2019/0199963 A1 | 6/2019 | Ahn et al. | |
| 2019/0238759 A1 | 8/2019 | Ahn | |
| 2019/0251118 A1 | 8/2019 | Ahn et al. | |
| 2019/0266444 A1 | 8/2019 | Ryan, Jr. et al. | |
| 2019/0342246 A1 * | 11/2019 | Theriault | H04L 63/30 |
| 2020/0021623 A1 * | 1/2020 | Nevick | H04L 63/306 |
| 2020/0137352 A1 | 4/2020 | Ahn et al. | |
| 2020/0145613 A1 | 5/2020 | Ahn et al. | |
| 2020/0213530 A1 | 7/2020 | Ahn | |
| 2020/0242750 A1 | 7/2020 | Kokkula et al. | |
| 2020/0335090 A1 * | 10/2020 | Freed | G06N 3/08 |
| 2021/0037271 A1 * | 2/2021 | Bikumala | G06V 40/174 |
| 2021/0099672 A1 | 4/2021 | Ahn et al. | |
| 2021/0203880 A1 | 7/2021 | Ahn et al. | |
| 2021/0203882 A1 | 7/2021 | Ahn et al. | |
| 2021/0243407 A1 | 8/2021 | Ahn et al. | |
| 2021/0243408 A1 | 8/2021 | Ahn et al. | |
| 2022/0229488 A1 * | 7/2022 | Akimoto | G06V 40/169 |
| 2022/0239862 A1 | 7/2022 | Ahn et al. | |
| 2022/0353464 A1 | 11/2022 | Ahn et al. | |

FOREIGN PATENT DOCUMENTS

| | | |
|---|---|---|
| EP | 3035283 A1 | 6/2016 |
| EP | 3800879 A1 | 4/2021 |
| JP | H0690279 A | 3/1994 |
| JP | H09200714 A | 7/1997 |
| JP | 2001205243 A | 7/2001 |
| JP | 2001309325 A | 11/2001 |
| JP | 2003219383 A | 7/2003 |
| JP | 2004532581 A | 10/2004 |
| JP | 2006270380 A | 10/2006 |
| JP | 2008159034 A | 7/2008 |
| JP | 2011082694 A | 4/2011 |
| JP | 2011205243 A | 10/2011 |
| JP | 2012018571 A | 1/2012 |
| JP | 2012054897 A | 3/2012 |
| JP | 2012146209 A | 8/2012 |
| JP | 2013531923 A | 8/2013 |
| JP | 2016122975 A | 7/2016 |
| JP | 2017228224 A | 12/2017 |
| JP | 2019047357 A | 3/2019 |
| JP | 2020010158 A | 1/2020 |
| JP | 2020500488 A | 1/2020 |
| KR | 20010000426 A | 1/2001 |
| KR | 20040064972 A | 7/2004 |
| KR | 100844334 B1 | 7/2008 |
| KR | 20080110064 A | 12/2008 |
| KR | 20110019499 A | 2/2011 |
| KR | 20110025720 A | 3/2011 |

(56) References Cited

FOREIGN PATENT DOCUMENTS

| | | |
|---|---|---|
| KR | 20110073238 A | 6/2011 |
| KR | 20120090870 A | 8/2012 |
| KR | 20120126677 A | 11/2012 |
| KR | 20140012474 A | 2/2014 |
| KR | 20150087362 A | 7/2015 |
| KR | 20180000255 A | 1/2018 |
| KR | 10-2018-0116520 A | 10/2018 |
| KR | 10-2019-0007934 A | 1/2019 |
| KR | 10-2019-0016671 A | 2/2019 |
| KR | 101989842 B1 | 6/2019 |
| WO | 2012131932 A1 | 10/2012 |
| WO | 201400774 A1 | 6/2014 |
| WO | 2015091487 A1 | 6/2015 |
| WO | 2015162647 A1 | 10/2015 |
| WO | 2016112299 A1 | 7/2016 |
| WO | 2018194243 A1 | 10/2018 |
| WO | 2018221824 A1 | 12/2018 |

OTHER PUBLICATIONS

Communication dated Oct. 9, 2020 from European Patent Office in EP Application No. 20173922.4.
Communication dated Apr. 21, 2020 from the Korean Intellectual Property Office in KR Application No. 10-2019-0054670.
Communication for Korean Patent Application No. 10-2017-0048893, dated Apr. 16, 2018, 9 Pgs.
Communication in Korean Patent Office in Application No. 10-2018-0174192, dated Nov. 25, 2019, 9 Pgs.
Extended European Search Report for Application No. 18213173.0, dated May 7, 2019, 8 Pgs.
Extended European Search Report for European Application No. 19156400.4, Search completed Apr. 11, 2019, dated Apr. 24, 2019, 11 Pgs.
Extended European Search Report for European Application No. 20199235.1, Search completed Feb. 10, 2021, dated Feb. 19, 2021, 7 Pgs.
Extended European Search Report for European Application No. 21154225.3, Search completed Apr. 20, 2021, dated Apr. 29, 2021, 7 Pgs.
Extended Search Report for European Application No. 17859740.7, Search completed Sep. 16, 2019, dated Sep. 24, 2019, 10 Pgs.
Extended Search Report for European Application No. 21154208.9, Search completed May 21, 2021, dated Jun. 4, 2021, 9 Pgs.
International Search Report and Written Opinion for International Application No. PCT/KR2018/000787, Search completed Apr. 26, 2018, dated Apr. 26, 2018, 12 Pgs.
International Search Report dated Jan. 18, 2018 in International Application No. PCT/KR2017/011139, in 3 pages.
Korean Office Action for Application No. 10-2017-0181512, dated Mar. 8, 2019, 8 Pgs.
Korean Office Action for Application No. 10-2019-0121524, dated Sep. 22, 2020, 9 Pgs.
Korean Office Action of KR 10-2020-0012270 dated Nov. 30, 2020, 5pgs.
Office Action dated Aug. 29, 2017 of Korean Patent Application No. 10-2016-0130656 which is the parent Application—6 pages.
Office Action dated Feb. 14, 2014 of Korean Patent Application No. 10-2016-0130656 which is the parent Application—5 pages.
Office Action for Japanese Patent Application No. 2021013320 dated Jan. 19, 2022, 6 pgs.
Office Action for Japanese Patent Application No. 2020-165934, dated Sep. 24, 2021.
Office Action issued from Korean Patent Application No. 10-2020-0012233, dated Nov. 20, 2020, 5 Pgs.
Office Action issued in Japanese Patent Application No. 2018-238541, dated Dec. 10, 2019, 12 Pgs.
Office Action dated Nov. 30, 2018 in Korean Application No. 10-2018-0134869, in 5 pages.
Translation of Office Action dated Jun. 29, 2020 in Japanese Application No. 2019-540499, in 3 pages.
Communication issued in Korean Patent Office in Application No. 10-2018-0012389, dated Jul. 31, 2019, 11 Pgs.
Dou et al., "Coarse-to-Fine Trained Multi-Scale Convolutional Neural Networks for Image Classification", IEEE, 2015, 7 pgs.
Freitas et al., "A Multimodal CNN-Based Tool to Censure Inappropriate Video Scenes", arxiv.org, Cornell University Library, 201 Olin Library Cornell University Ithaca, NY 14853, Nov. 10, 2019, XP081529770.
Sood et al., "Automatic Identification of Personal Insults on Social News Sites", Journal of the American Society for Information Science and Technology, Feb. 1, 2012, vol. 63, No. 2, pp. 270-285, Published Online Oct. 28, 2011.
Xing et al., "SafeVchat: Detecting Obscene Content and Misbehaving Users in Online Video Chat Services", World Wide Web, ACM, Mar. 28, 2011, pp. 685-694.
Office Action for Japanese Patent Application No. 2021013354 dated Mar. 9, 2022, 4 pgs.

\* cited by examiner

VIDEO CALL MEDIATION METHOD

CROSS-REFERENCE TO THE RELATED APPLICATION

This application is based on and claims priority from Korean Patent Application No. 10-2019-0054670 filed on May 10, 2019 in the Korean Intellectual Property Office, the disclosure of which is incorporated herein in its entirety by reference.

BACKGROUND

1. Field

The present disclosure relates to a mobile for preventing a user performing a video call from being exposed to inappropriate video from a counterpart, and a server and operating method thereof.

2. Background

With the development of communication technology and the miniaturization of electronic devices, personal mobiles are being widely spread among general consumers. In particular, in recent years, portable personal mobiles such as smart phones or smart tablets have been widely used. Most mobiles include communication functions. Users can use mobiles to search in the internet or exchange messages with other users.

Further, with the development of miniaturized camera technology, miniaturized microphone technology, miniaturized display technology and miniaturized speaker technology, most mobiles such as smartphones include cameras, microphones, displays and speakers. A user can record a voice or photograph a video that includes voices, using mobiles. A user can check a recorded voice through a speaker included in a mobile or check a photographed video through a display.

Further, a user can share the recorded voice or photographed video with other users using the communication function of the mobile. A user can transmit previously recorded voice or previously photographed video to other users. Further, a user can transmit a voice that is currently being recorded or a video that is currently being photographed by the mobile to other users in real time.

The display included in a user's mobile can display the video that is currently being photographed by the user's mobile and the video that is currently being photographed by another user's mobile, at the same time. Further, the speaker included in the user's mobile can replay the voice that is currently being recorded by the other mobile's user, at the same time. In other words, the user and the other user can make a video call to each other using their respective mobiles.

The user and the other user may already know each other, or may not know each other. Even if they do not know each other, the user and the other user may make a video call to each other through mediation of a server. When the user and the counterpart are having a video call to each other, the user may be exposed to an obscene video from the counterpart. Especially, when the user is having a video call with a counterpart and they do not know each other, there is a high possibility that the user can be exposed to an obscene video from the counterpart.

For example, a video of the counterpart's naked body photographed by the counterpart's mobile can be received in the user's mobile through a video call session. When the user is exposed to such obscene video, the user may feel sexual shame or discomfort.

SUMMARY

According to the disclosed embodiment, a mobile capable of preventing a user having a video call with a counterpart from being exposed to obscene video from the counterpart, and a server and operating method thereof, may be provided.

Further, a mobile capable of preventing a user having a video call with a counterpart from feeling sexual shame or discomfort due to the video from the counterpart, and a server and operating method thereof, may be provided.

Further, a mobile capable of inducing healthy video calls between users, and a server and operating method thereof, may be provided.

An operating method of a first mobile according to an embodiment of the present disclosure may include receiving information of connection to a second mobile, from a server; establishing a video call session with the second mobile, using the received information of connection; receiving a video, from the second mobile, through the video call session; detecting a certain input, from a received input that corresponds to the received video or from the received video; reporting the received video, to the server, in response to the certain input; receiving information of connection to a third mobile that is different from the second mobile, from the server, in response to the report; and ending the video call session, and establishing a video call session with the third mobile using the received information of connection to the third mobile.

In an embodiment, the detecting of the certain input, by the first mobile, may involve detecting, by the first mobile, at least one of a certain manipulation, a certain video, and a certain sound.

In an embodiment, the operating method of the first mobile may further include outputting, by the first mobile, the received video, and the detecting of the certain input, by the first mobile, may involve receiving, by the first mobile, the certain input, in response to the output of the received video.

In an embodiment, the detecting of the certain input, by the first mobile, may involve detecting, by the first mobile, a certain manipulation on the first mobile, as the certain input.

In an embodiment, the detecting of the certain manipulation, by the first mobile, may involve detecting, by the first mobile, at least one of a manipulation of throwing the first mobile, a manipulation of dropping the first mobile, a manipulation of turning the first mobile over, a manipulation of shaking the first mobile, a manipulation of covering a display of the first mobile, a manipulation of repeatedly pressing a button of the first mobile, and a manipulation of repeatedly inputting a touch gesture into the first mobile, as the certain manipulation.

In an embodiment, the detecting of the certain input, by the first mobile, may include photographing, by the first mobile, a video of surroundings of the first mobile; and detecting a part that corresponds to a certain facial expression, body language, and body part, from the photographed video, as the certain input of the first mobile.

In an embodiment, the detecting of the part that corresponds to the certain facial expression, body language, and body part, by the first mobile, may involve detecting, by the first mobile, the part that corresponds to at least one of a frowning facial expression, alarmed facial expression, dilated pupils, gesture to avoid gaze from the first mobile, gesture to cover eyes, and gesture to place a palm of a hand towards the first mobile, from the photographed video.

In an embodiment, the detecting of the certain input, by the first mobile, may include recording, by the first mobile, a sound occurring from surroundings of the first mobile; and detecting, by the first mobile, a part that corresponds to a certain voice or language, from the recorded sound, as the certain input.

In an embodiment, the detecting of the part that corresponds to the certain voice or language, by the first mobile, may involve detecting, by the first mobile, a part that corresponds to at least one of a scream or verbal abuse, from the recorded sound.

In an embodiment, the detecting of the certain input, by the first mobile, may involve detecting, by the first mobile, at least one of a part that corresponds to a certain facial expression, body language, and body part, from the received video, as the certain input.

In an embodiment, the detecting of the part that corresponds to the certain facial expression, body language, or body part, by the first mobile, may involve, detecting, by the first mobile, a part that corresponds to at least one of a verbal abuse gesture, insulting gesture, racist gesture, sexual content, nudity, unsanitary content, antisocial content, antihuman content, illegal behavior, criminal behavior, and hateful content, from the received video.

In an embodiment, the first mobile may receive a sound that corresponds to the received video, from the second mobile, through the video call session.

In an embodiment, the first mobile may output the received video and the received sound.

In an embodiment, the detecting of the certain input, by the first mobile, may involve detecting, by the first mobile, a part that corresponds to at least one of a certain voice, noise and language, from the received sound, as the certain input.

In an embodiment, the certain voice may include at least one of moaning, screaming, and shouting, and the certain noise may include at least one of a roar, a gunshot, a sound with a pitch of a certain threshold or above, and a sound having a size of a certain threshold or above, and the certain language may include a language related to at least one of a verbal abuse, insult, defamation, sexual harassment, antisocial behavior, and hate speech.

A mobile according to an embodiment of the present disclosure may include a communication interface for receiving information of connection to a first mobile, from a server, establishing a video call session with the first mobile, using the received information of connection, and receiving a video from the first mobile, through the video call session; an output interface for outputting the received video; an input interface for receiving an input that corresponds to the received video; and a processor for detecting a certain input from the received input or the received video, wherein the communication interface reports the received video to the server, in response to the certain input, receives information of connection to a second mobile that is different from the first mobile, from the server, in response to the report, ends the video call session, in response to the receiving of the information of connection to the second mobile, and establishes a video call session with the second mobile, using the received information of connection to the second mobile.

A video call mediation method of a server according to an embodiment of the present disclosure may include receiving, by the server, a mediation request from a plurality of mobiles; mediating, by the server, a video call connection between a first mobile and a second mobile, of the plurality of mobiles; in response to a certain input being detected by the first mobile, receiving, by the server, a report for a video received by the second mobile, from the first mobile; in response to the report, selecting, by the server, a third mobile that is different from the second mobile, of the plurality of mobiles, and mediating a video call between the first mobile and the third mobile; and verifying, by the server, the report, and rejecting additional mediation request of the second mobile, depending on a result of the verification.

A video call mediation method of a system according to an embodiment of the present disclosure may include receiving, by the server, a mediation request, from a plurality of mobiles; mediating, by the server, a first mobile and a second mobile, of the plurality of mobiles; establishing, by the first mobile and the second mobile, a video call session; receiving, by the first mobile, a video from the second mobile, through the video call session; detecting, by the first mobile, a certain input; in response to the certain input, reporting, by the first mobile, the received video, to the server; in response to the report, selecting, by the server, a third mobile that is different from the second mobile, of the plurality of mobiles, and mediating, by the server, the first mobile and the third mobile; ending, by the first mobile, the video call session with the second mobile, and establishing, by the first mobile, a video call session with the third mobile; and verifying, by the server, the report, and rejecting additional mediation request of the second mobile, depending on a result of the verification.

According to the disclosed embodiment, a user having a video call with a counterpart may be prevented from being exposed to an obscene video from the counterpart.

Further, the user having a video call with the counterpart may be prevented from feeling sexual shame or discomfort due to the video from the counterpart.

Further, healthy video calls may be induced between the users.

DETAILED DESCRIPTION

Figure 1:
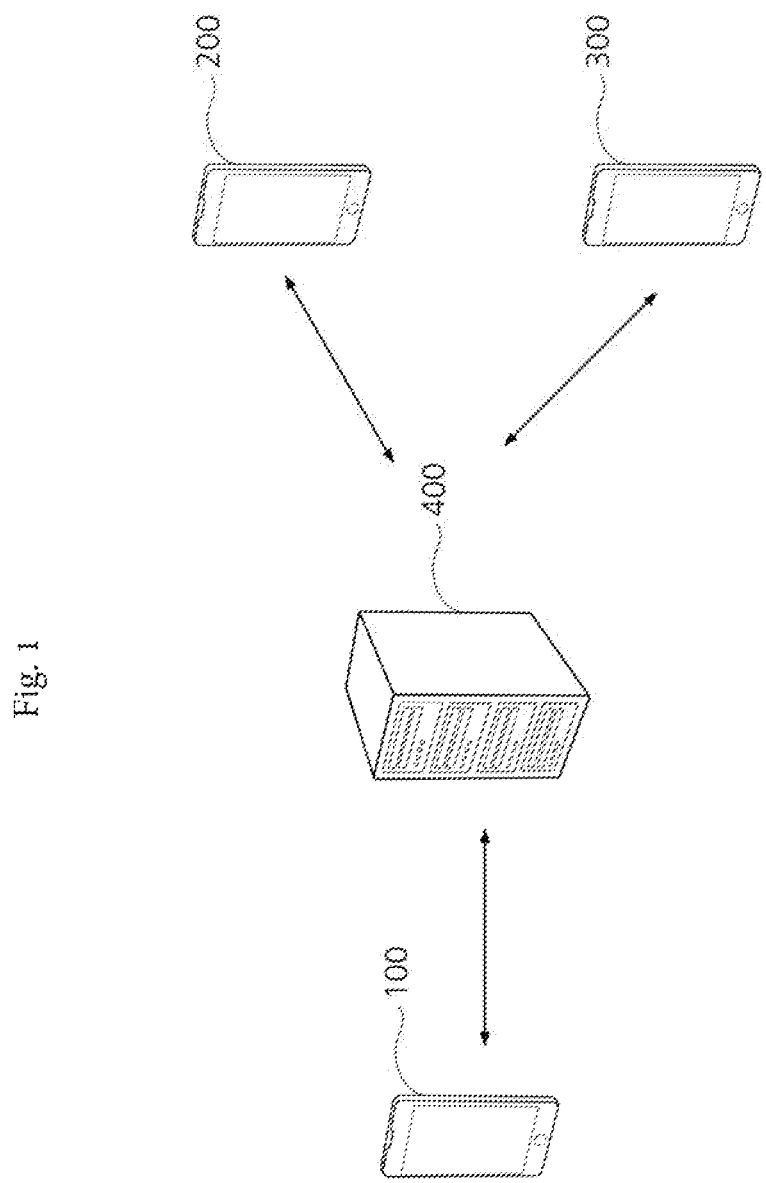
FIG. 1 is a system configuration diagram illustrating an environment where an electronic device operates according to an embodiment of the present disclosure.

The advantages and characteristics of the present disclosure, and the method for achieving those advantages and characteristics will be clarified with reference to the embodiments that will be explained hereinafter together with the drawings attached hereto. However, the present disclosure is not limited to the embodiments disclosed hereinafter, but may be implemented in various different forms, and the present embodiments are provided merely for the purpose of complete disclosure of the present disclosure, and for the purpose of informing a person skilled in the art of the complete scope of the present disclosure, and the present disclosure is to be defined only by the scope of the claims. Like reference numerals indicate like configurative elements throughout the entirety of the specification.

Even though "a first" or "a second" and the like are used to describe various configurative elements, these configurative elements are not limited by the aforementioned terms. The aforementioned terms can only be used to differentiate one configurative element from other configurative elements. Therefore, a first configurative element mentioned hereinafter may be a second configurative element within the technical idea of the present disclosure.

The terms used in the present specification were used to describe the embodiments, and not to limit the present disclosure. In the present specification, a singular form includes plural forms unless specially mentioned otherwise. "Comprises" or "comprising" used in the present specification imply that the mentioned configurative element or step does not exclude the presence or addition of one or more other configurative element or step.

Unless defined otherwise, all the terms used in the present specification may be construed to mean what may be commonly understood by a person skilled in the art. Further, the terms defined in generally used dictionaries should not be construed ideally or overly unless clearly defined specially.

FIG. 1 is a system configuration diagram illustrating an environment where an electronic device operates according to an embodiment of the present disclosure. Referring to FIG. 1, the environment where a plurality of electronic devices 100~300 operate may include a server 400 and the plurality of electronic devices 100~300. For example, the environment where the plurality of electronic devices 100~300 operate may not include the server 400.

Each of the plurality of electronic devices 100~300 may be connected by medium of the server 400. For convenience of describing the present disclosure, three electronic devices are illustrated in FIG. 1. However, the number of the electronic devices is not limited to three. Each of the plurality of electronic devices 100~300 may be implemented as one of a desktop computer, laptop computer, smart phone, smart tablet, smart watch, mobile terminal, digital camera, wearable device, or portable electronic device. Each of the plurality of electronic devices 100~300 may execute a program or an application.

Each of the plurality of electronic devices 100~300 may be connected to a communication network. Each of the plurality of electronic devices 100~300 may be interconnected or connected to the server 400 through the communication network. Each of the plurality of electronic devices 100~300 may output data to another interconnected device or receive data from the other interconnected device.

The communication network connected to each of the plurality of electronic devices 100~300 may include a wired communication network, a wireless communication network, or a composite communication network. The communication network may include a mobile communication network such as 3G, LTE or LTE-A, etc. The communication network may include a wired or wireless communication network such as Wi-Fi, UMTS/GPRS, or Ethernet, etc. The communication network may include a local area communication network such as Magnetic Secure Transmission (MST), Radio Frequency IDentification (RFID), Near Field Communication (NFC), ZigBee, Z-Wave, Bluetooth, Bluetooth Low Energy (BLE), or Infra-Red communication (IR), etc. The communication network may include Local Area Network (LAN), Metropolitan Area Network (MAN), or Wide Area Network (WAN), etc.

The plurality of electronic devices 100~300 may exchange messages, files, audio data, images, or videos with each other. For example, the plurality of electronic devices 100~300 may establish a video call session with each other using Transmission Control Protocol (TCP), User Datagram Protocol (UDP), or Web Real-Time Communication (WebRTC), etc.

The video call session may be established directly between at least two electronic devices of the plurality of electronic devices 100~300. According to another embodiment, the video call session may be established between at least two electronic devices of the plurality of electronic devices 100~300 via at least one other device. For example, the video call session may include a session established between the first electronic device 100 and the server 400, and a session established between the server 400 and the second electronic device 200.

The server 400 may connect the plurality of electronic devices 100~300 so that they can perform communication with each other. For example, the server 400 may provide a video call service so that the plurality of electronic devices 100~300 can establish the video call session. The server 400 may receive a mediation request from each of the plurality of electronic devices 100~300. In response to the mediation request, the server 400 may mediate the plurality of electronic devices 100~300.

In some embodiments, the server 400 may receive a report from one of the plurality of electronic devices 100~300 performing a video call. The server 400 may verify the report, and may reject additional mediation request of a counterpart mobile of the mobile that transmitted the report.

Hereinbelow, for convenience of describing the present disclosure, electronic device and mobile may be used to have the same meaning.

Figure 2:
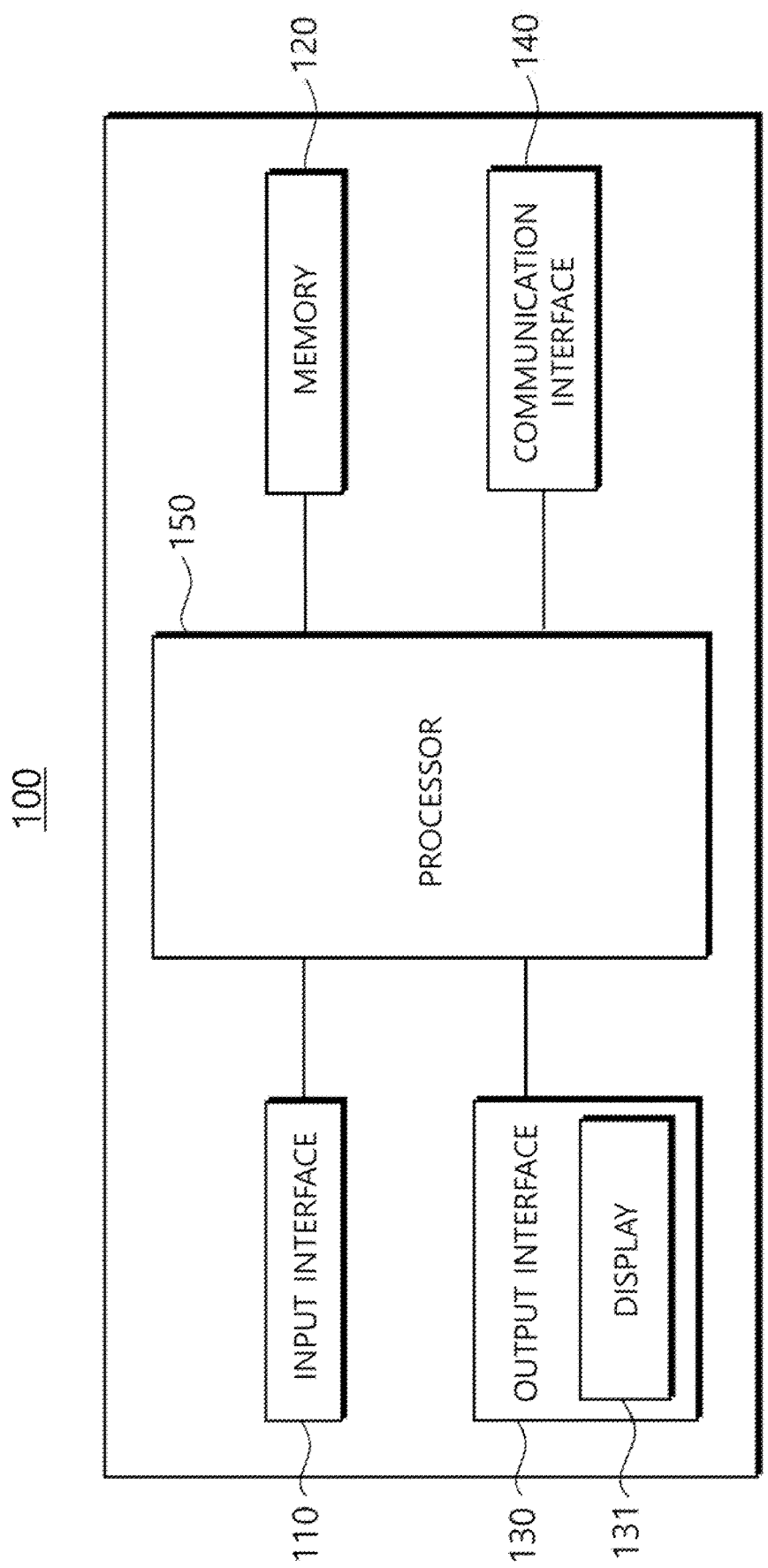
FIG. 2 is a block diagram illustrating a configuration of a mobile according to an embodiment of the present disclosure.

FIG. 2 is a block diagram illustrating a configuration of the mobile according to an embodiment of the present disclosure. Referring to FIG. 2, a first mobile 100 may include an input interface 110, a memory 120, an output interface 130, a communication interface 140, and a processor 150. Each of the second mobile 200 and the third mobile 300 illustrated in FIG. 1 may be implemented similarly or identically as the first mobile 100.

The input interface 110 may receive signals from outside. The input interface 110 may receive the signals from a user of the mobile 100. Further, the input interface 110 may receive the signals from an external device. The input interface 110 may include, for example, a microphone, a camera, a keyboard, a mouse, a trackball, a touchscreen, a button, a switch, a sensor, a network interface, or other input devices, etc. The input interface 110 may receive voices from outside through the microphone included in the input interface 110.

Further, the input interface 110 may receive images photographed from the camera (not illustrated) included in the input interface 110, or receive gestures from the user of the mobile 100. Otherwise, the touchscreen included in the input interface 110 may receive touch inputs from the user of the mobile 100. Otherwise, from the microphone (not illustrated) included in the input interface 110, the voice of the user of the mobile 100 or surrounding sounds of the mobile 100 may be received. The input interface 110 may receive user information or user inputs received from the user of the mobile 100. For example, the user information may include at least one of hobby information, gender information, country information, or age information of the user of the mobile 100. In addition, the user input may be a touch input received from the user of the mobile 100.

The memory 120 may store data. The memory 120 may store the voice or image data received from the input interface 110. In addition, the memory 120 may store results of computation performed by the processor 150. For example, the memory 120 may store a voice encoded by the processor 150. The memory 120 may store the data to be output externally through the communication interface 140, or store the data received from outside through the communication interface 140.

The memory 120 may store a software or a program. For example, the memory 120 may store programs and various types of data such as an application, and an Application Programming Interface (API), etc. The memory 120 may store instructions that are executable by the processor 150.

The memory 120 may include at least one of a volatile memory or a nonvolatile memory. The memory 120 may include at least one of, for example, flash memory, Read Only Memory (ROM), Random Access Memory (RAM), Electrically Erasable ROM (EEROM), Erasable Programmable ROM (EPROM), Electrically Erasable Programmable ROM (EEPROM), Hard Disk Drive (HDD), or register. The memory 120 may include, for example, a file system, a database, or an embedded database, etc.

The output interface 130 may include a display 131. The display 131 may display a screen. The display 131 may display a user interface. The display 131 may display another screen in response to an input from the user.

The display 131 may display data. The display 131 may display the result of computation performed by the processor 150. The display 131 may display the data stored in the memory 120. The display 131 may display the data received by the communication interface 140. For example, the display 131 may display the video received from the input interface 110.

For example, the display 131 may include a flat panel display device such as Liquid Crystal Display (LCD), Organic Light Emitting Diode (OLED), or Plasma Display Panel (PDP), etc. The display 131 may include a curved-surface display or a flexible display. The display 131 may include a touchscreen. In a case where the display 131 includes the touchscreen, the display 131 may operate as the input interface 110 at the same time as performing the output operations.

The output interface 130 may output sound. The output interface 130 may output the sound received through the input interface 110 or the sound received through an external device. For example, the output interface 130 may include a speaker (not illustrated).

The communication interface 140 may output data to outside of the mobile 100 or receive data from the outside. The communication interface 140 may output the data to the server 400 or to an external device. The communication interface 140 may receive the data from the server 400 or from the external device. The communication interface 140 may output the result of computation performed by the processor 150, to the outside.

The communication interface 140 may output a report generated based on a certain input that is input from the user of the mobile 100, to the server 400. Otherwise, the communication interface 140 may output the user information or the user input information stored in the memory 120, to the server 400.

The communication interface 140 may include, for example, a remote network interface such as 3G module, LTE module, LTE-A module, Wi-Fi module, WiGig module, Ultra Wide Band (UWB) module, or LAN card, etc. Further, the communication interface 140 may include a local area network interface such as Magnetic Secure Transmission (MST) module, Bluetooth module, NFC module, RFID module, ZigBee module, Z-Wave module, or infrared ray module, etc. Further, the communication interface 140 may include other network interfaces.

The processor 150 or each of the configuration elements included in the processor 150 may be implemented in the form of software or hardware. For example, the software may be implemented as program execution instructions such as mechanical codes, firmware codes, embedded codes, and applications, etc. The hardware may be an electric electronic circuit, processor, computer, pressure sensor, inertia sensor, MicroElectroMechanical System (MEMS), passive elements, or a combination thereof.

The processor 150 may control operations of the mobile 100. The processor 150 may be interconnected with each of the configuration elements included in the mobile 100, and may control the operations of each of the configuration elements included in the mobile 100. The processor 150 may control the operations of the mobile 100 in response to the signal received by the input interface 110.

In some embodiments, the processor 150 may detect a certain input received through the input interface 110. For example, the certain input may include at least one of a certain manipulation, a certain video, or a certain sound, input by the user of the first mobile 100. When the certain input is detected, the processor 150 may report the video received in the first mobile 100, to the server 400.

Figure 3:
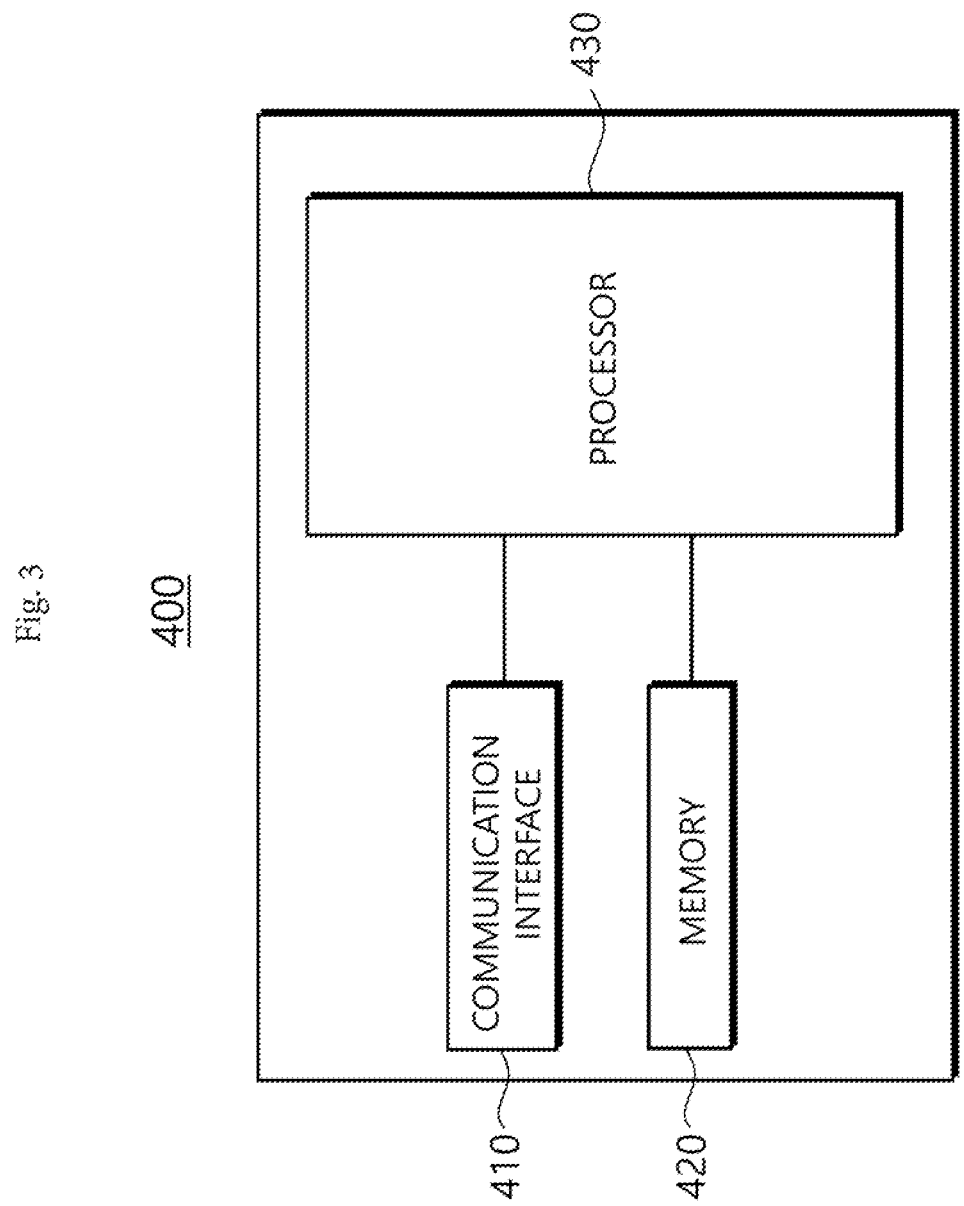
FIG. 3 is a block diagram illustrating a configuration of a server according to an embodiment of the present disclosure.

FIG. 3 is a block diagram illustrating a configuration of the server according to an embodiment of the present disclosure. Referring to FIGS. 1 and 3, the server 400 may include a communication interface 410, a memory 420, and a processor 430.

The communication interface 410 may output data to outside of the server 400, or receive data from the outside. The communication interface 410 may output the data to the plurality of mobiles 100~300, and receive the data from the plurality of mobiles 100~300. The communication interface 410 may output the result of computation performed by the processor 430, to the outside. Further, the communication interface 410 may output the data stored in the memory 420, to the outside.

The communication interface 410 may receive information from which the country can be inferred, from at least one of the plurality of mobiles 100~300. The data to be output by the communication interface 410, or the data received by the communication interface 410 may be stored in the memory 420.

The communication interface 410 may include, for example, a remote network interface such as 3G module, LTE module, LTE-A module, Wi-Fi module, WiGig module, Ultra Wide Band (UWB) module, or LAN card, etc. Further, the communication interface 410 may include a local area network interface such as MST module, Bluetooth module, NFC module, RFID module, ZigBee module, Z-Wave module, or infrared ray module, etc. Further, the communication interface 410 may include other network interfaces.

The memory 420 may store programs and various types of data such as an application, and an application programming interface (API), etc. The memory 420 may store instructions that are executable by the processor 430. For example, the application may be an application that can provide video call services to the plurality of mobiles 100~300.

The memory 420 may store the information received through the communication interface 410. For example, the memory 420 may store country information that the user of each of the plurality of mobiles 100~300 input when subscribing the application, and information received from at least one of the plurality of mobiles 100~300, from which country can be inferred.

The memory 420 may include at least one of a volatile memory or a nonvolatile memory. The memory 420 may include at least one of, for example, flash memory, ROM, EEROM, EPROM, EEPROM, Hard Disk Drive or register. The memory 420 may include, for example, a file system, a database, or an embedded database, etc.

The processor 430 or each of the configuration elements included in the processor 430 may be implemented in the form of software or hardware. For example, the software may be implemented as program execution instructions such as mechanical codes, firmware codes, embedded codes, and applications, etc. The hardware may be an electric electronic circuit, processor, computer, pressure sensor, inertia sensor, MEMS, passive elements, or a combination thereof.

The processor 430 may execute the instructions and application stored in the memory 420. For example, the processor 430 may determine whether to accept a log in request of the plurality of mobiles 100~300 by executing the application. For example, when the log in request is received from at least one of the plurality of mobiles 100~300, the processor 430 may compare the country information stored in the memory 420 with the information received from the mobile that requested the log in, from which the country can be inferred, and determine whether to accept the log in request. However, the type of the contents included in an image received from at least one, may be identified.

The detailed operating method of the plurality of mobiles 100~300 and the server 400 may be described with reference to FIGS. 4 to 8.

Figure 4:
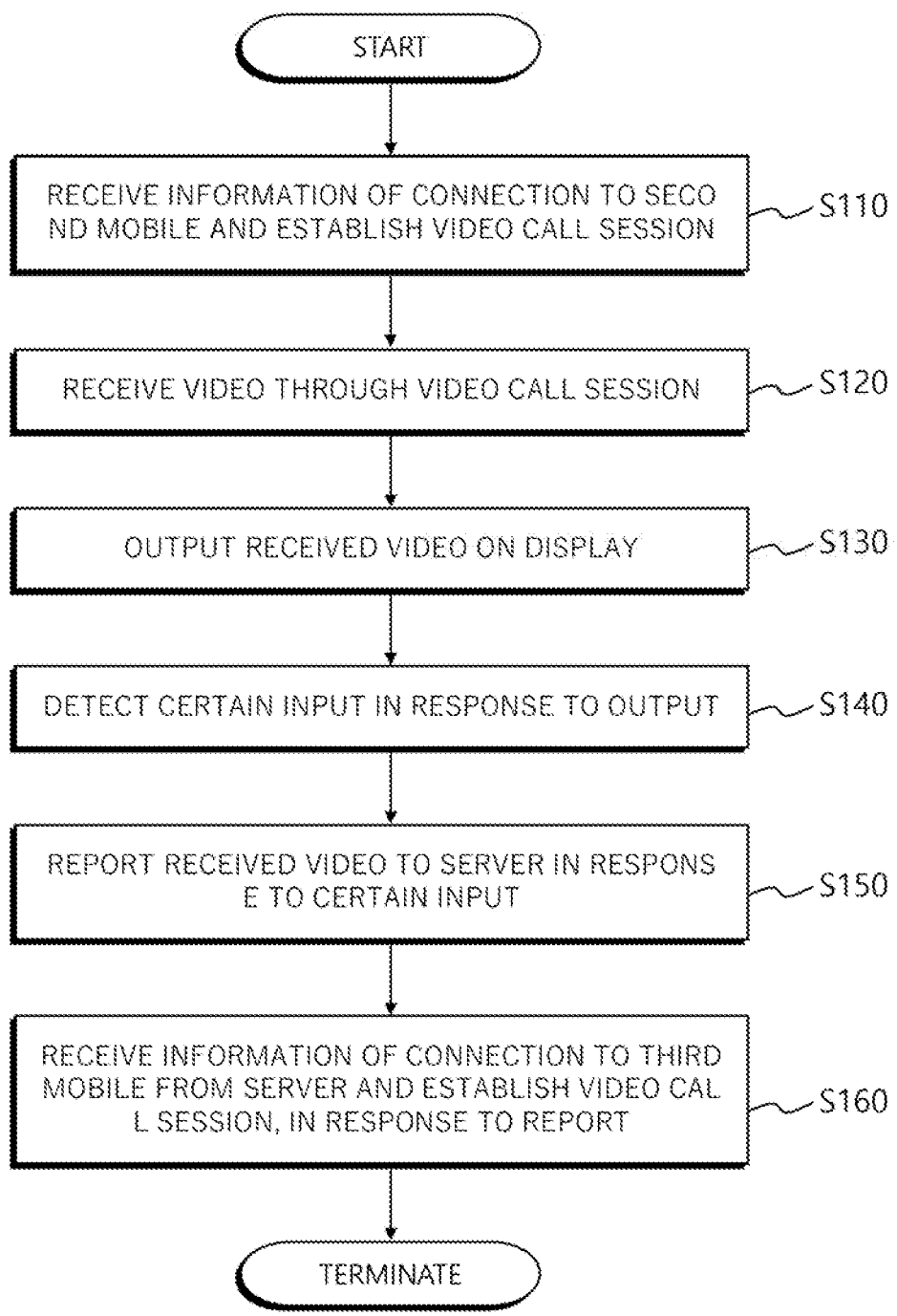
FIG. 4 is a flowchart illustrating a method in which a mobile reports a received video according to an embodiment of the present disclosure.

FIG. 4 is a flowchart illustrating a method in which the mobile reports the received video according to an embodiment of the present disclosure.

Referring to FIGS. 1, 2 and 4, at step S110, the first mobile 100 may receive information of connection to the second mobile 200. In addition, the first mobile 100 may establish a video call session with the second mobile 200 based on the received information of connection.

At step S120, the first mobile 100 may receive a video from the second mobile 200 through the video call session. The video may include a video of the face or a video of the body of the user of the second mobile 200. Otherwise, the video may include a video of the surroundings of the second mobile 200.

The first mobile 100 may receive the video directly from the second mobile 200. According to another embodiment, the first mobile 100 may receive the video via the server 400.

At step S130, the first mobile 100 may output the received video through the display 131 of the output interface 130. The output video may be provided to the user of the first mobile 100.

At step S140, in response to the output of the video, the first mobile 100 may detect a certain input. For example, when obscene contents are included in the video received from the second mobile 200, the user of the first mobile 100 may show a certain body language or make a certain sound. Otherwise, the user of the first mobile 100 may take a certain action to the first mobile 100.

In an embodiment of the present disclosure, the first mobile 100 may detect a certain manipulation, a certain facial expression, a certain body language, or a certain sound, received from the user of the first mobile 100, as the certain input. The method in which the first mobile 100 detects the certain input may be described in detail with reference to FIGS. 5 to 7.

In an embodiment of the present disclosure, the first mobile 100 may detect a certain manipulation on the first mobile 100, as the certain input. For example, if there are obscene contents included in the video that is output through the display 131 of the first mobile 100, the user of the first mobile 100 may take at least one action of a manipulation of throwing the first mobile 100, a manipulation of dropping the first mobile 100, a manipulation of turning the first mobile 100 over, a manipulation of shaking the first mobile 100, a manipulation of covering the display 131 of the first mobile 100, a manipulation of repeatedly pressing a certain button of the first mobile 100, or a manipulation of repeatedly inputting a touch gesture into the display 131 of the first mobile 100.

The first mobile 100 may detect at least one of the manipulation of throwing the first mobile 100, the manipulation of dropping the first mobile 100, the manipulation of turning the first mobile 100 over, the manipulation of shaking the first mobile 100, the manipulation of covering the display 131 of the first mobile 100, the manipulation of repeatedly pressing a certain button of the first mobile 100, or the manipulation of repeatedly inputting a touch gesture into the display 131 of the first mobile 100, using a sensor.

Figure 5:
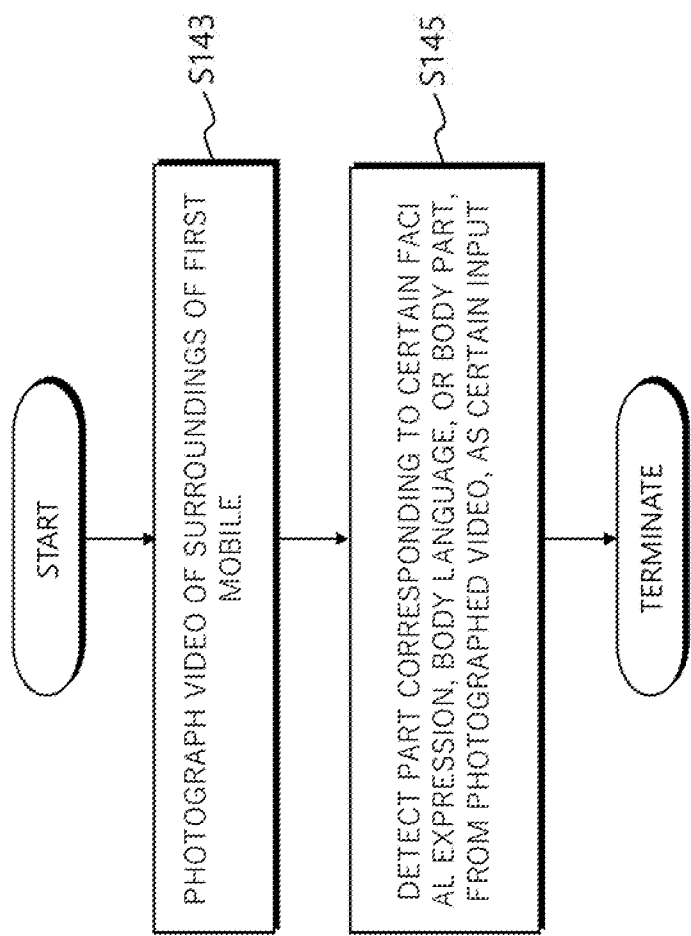
FIG. 5 is a flowchart illustrating a method in which a first mobile detects a certain input according to another embodiment of the present disclosure.

FIG. 5 is a flowchart illustrating a method in which the first mobile detects a certain input according to another embodiment of the present disclosure.

Referring to FIGS. 4 and 5, at step S143, the first mobile 100 may photograph a video of the surroundings of the first mobile 100. For example, the video of the surroundings may include a video of the user of the first mobile 100 or a video of the surrounding environment of the first mobile 100.

At step S145, from the photographed video, the first mobile 100 may detect a video that corresponds to a certain facial expression, body language, or body part of the user of the first mobile 100, as the certain input.

In some embodiments, from the photographed video, the first mobile 100 may detect at least one of a frowning facial expression, alarmed expression, dilated pupils, gesture to avoid gaze from the first mobile 100, gesture to cover eyes, or gesture of placing a palm of a hand towards the first mobile 100, of the user of the first mobile 100.

Figure 6:
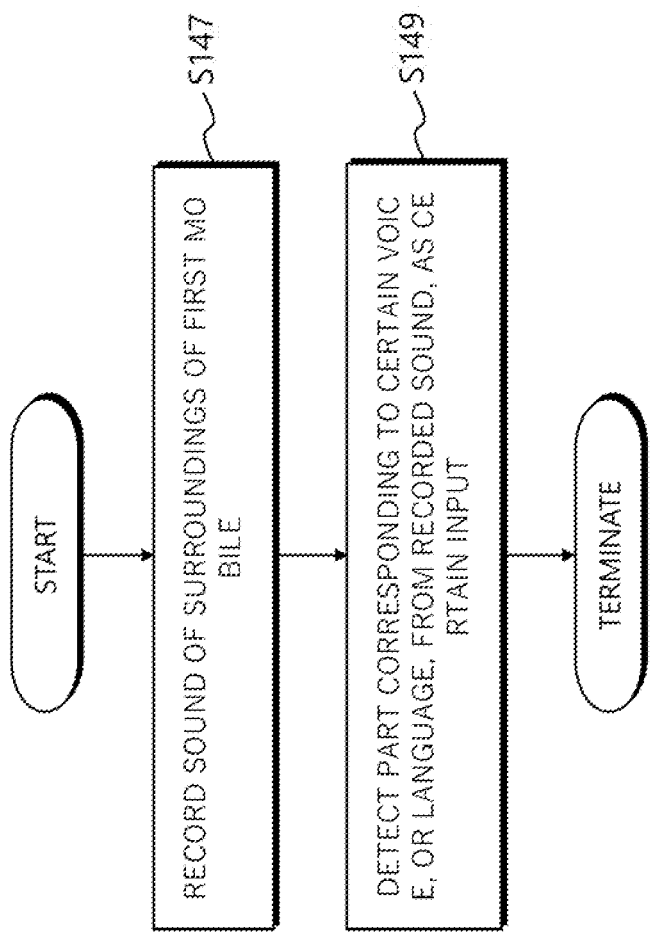
FIG. 6 is a flowchart illustrating a method in which a first mobile detects a certain input according to another embodiment of the present disclosure.

FIG. 6 is a flowchart illustrating a method in which the first mobile detects a certain input according to another embodiment of the present disclosure.

Referring to FIGS. 4 and 6, at step S147, the first mobile 100 may record the sound occurring from the surroundings of the first mobile 100. For example, the sound occurring from the surroundings may include the voice of the user of the first mobile 100, or usual life noise occurring from the surroundings of the first mobile 100.

At step S149, from the recorded sound, the first mobile 100 may detect a certain voice, or language, as the certain input. In some embodiments, from the recorded sound, the first mobile 100 may detect a part that corresponds to at least one of a scream or verbal abuse.

Referring to FIG. 4 again, at step S150, in response to the certain input, the first mobile 100 may report the received video to the server 400. More specifically, when a certain input is detected, the processor 150 of the first mobile 100 may determine that obscene contents are included in the video received from the second mobile 200.

The processor 150 of the first mobile 100 may capture the video being output through the display 131 at the moment the certain input is being detected, and convert the captured video into an image. Otherwise, the processor 150 of the first mobile 100 may record the video being output through the display 131 during a standard period of time after the certain input is detected. The first mobile 100 may output the captured image or recorded video to the server 400 through the communication interface 140.

At step S160, in response to the report, the first mobile 100 may receive information of connection to the third mobile 300, from the server 400. In addition, the video call session between the first mobile 100 and the second mobile 200 may end, and the first mobile 100 may establish a video call session with the third mobile 300 using the received information of connection to the third mobile 300.

Figure 7:
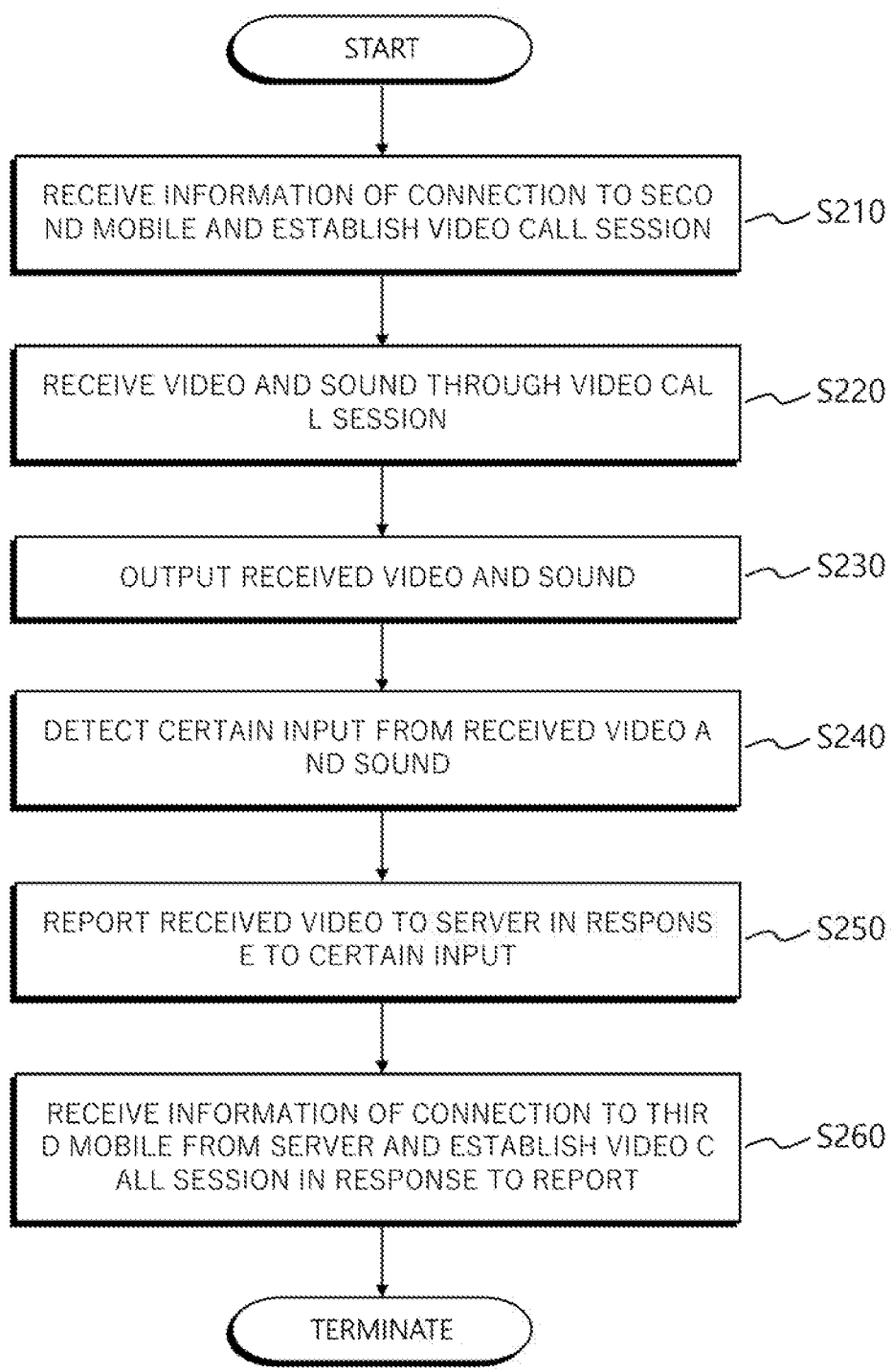
FIG. 7 is a flowchart illustrating a method in which a mobile reports a received video according to another embodiment of the present disclosure.

FIG. 7 is a flowchart illustrating a method in which the mobile reports the received video according to another embodiment of the present disclosure.

Referring to FIGS. 2 and 7, at step S210, the first mobile 100 may receive information of connection to the second mobile 200. In addition, the first mobile 100 may establish a video call session with the second mobile 200 based on the received information of connection.

At step S220, the first mobile 100 may receive a video and sound from the second mobile 200 through the video call session. The video may include the video of the face or video of the body of the user of the second mobile 200. Otherwise, the video may include a video of the surroundings of the second mobile 200. The sound may include a voice of the user of the second mobile 200. Otherwise, the sound may include usual life noise occurring in the surroundings of the second mobile 200.

In some embodiments, the first mobile 100 may receive the video and sound directly from the second mobile 200. According to another embodiment, the first mobile 100 may receive the video and sound via the server 400.

At step S230, the first mobile 100 may output the received video and sound through the output interface 130. The output video and sound may be provided to the user of the first mobile 100.

At step S240, the first mobile 100 may detect a certain input from the received video and sound. If obscene contents are included in the video or sound received from the second mobile 200, the user of the first mobile 100 may detect the obscene contents as the certain input. In some embodiments, from the photographed video, the first mobile 100 may detect a video that corresponds to a certain facial expression, body language, or body part, as the certain input.

In some embodiments, from the video received from the second mobile 200, the first mobile 100 may detect a part that corresponds to a certain facial expression, body language, or body part.

More specifically, from the video received from the second mobile 200, the first mobile 100 may detect a part that corresponds to at least one of a verbal abuse gesture, insulting gesture, racist gesture, sexual content, nudity, genital, sexual intercourse, unsanitary content, excreta, excreting behavior, antisocial content, anti-human content, illegal behavior, criminal behavior, hate crime, violent behavior, abusive behavior, self-harming behavior, weapon, drugs, antisocial symbol, hateful content, threatening content, phobia-inducing content, or blood.

In some embodiments, from the sound received from the second mobile 200, the first mobile 100 may detect a part that corresponds to a certain voice or language. In some embodiments, from the recorded sound, the first mobile 100 may detect a part that corresponds to at least one of a scream or verbal abuse.

More specifically, from the received sound, the first mobile 100 may detect at least one of a roar, a gunshot, a vomit sound, a hit sound, a whip sound, a knife sound, a swing sound, a stab sound, a saw sound, a grating sound, a creaking sound, a sound with a pitch of a certain threshold or above, or a sound having loudness of a certain threshold or above.

Referring to FIG. 7 again, at step S250, in response to the certain input, the first mobile 100 may report the received video, to the server 400. More specifically, if a certain input is detected from the received video or sound, the processor 150 of the first mobile 100 may determine that obscene contents are included in the video received from the second mobile 200.

The processor 150 of the first mobile 100 may capture the video being output through the display 131 at the moment the certain input is being detected, and convert the captured video into an image. Otherwise, the processor 150 of the first mobile 100 may record the video being output through the display 131 during a standard period of time after the certain input is detected. The first mobile 100 may output the captured image or recorded video to the server 400 through the communication interface 140.

At step S260, in response to the report, the first mobile 100 may receive information of connection to the third mobile 300, from the server 400. In addition, the video call session between the first mobile 100 and the second mobile 200 may end, and a video call session with the third mobile may be established using the received information of connection to the third mobile 300.

Figure 8:
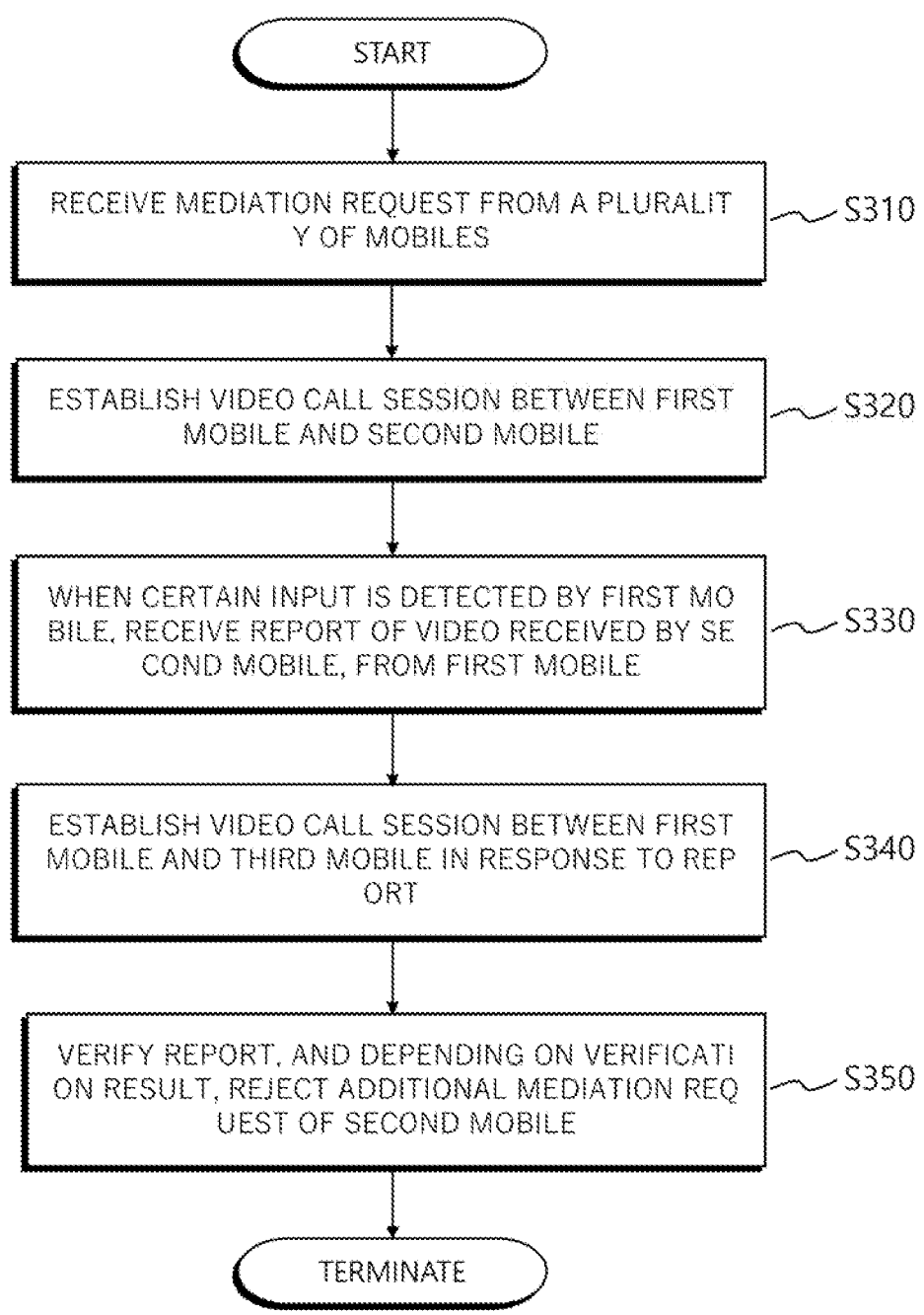
FIG. 8 is a flowchart illustrating a mediation method of a server according to an embodiment of the present disclosure.

FIG. 8 is a flowchart illustrating a mediation method of the server according to an embodiment of the present disclosure. Referring to FIGS. 1, 3 and 8, at step S310, the server 400 may receive a mediation request from each of the plurality of mobiles 100~300. In response to the mediation request, the server 400 may mediate the plurality of mobiles 100~300.

At step S320, the server 400 may establish a video call session between the first mobile 100 and the second mobile 200. The server 400 may transmit a first video and a first sound received from the first mobile 100, to the second mobile 200. In addition, the server 400 may transmit a second video and a second sound received from the second mobile 200, to the first mobile 100.

At step S330, when a certain input is detected by the first mobile 100, the server 400 may report the report on the video received by the second mobile 200, from the first mobile 100.

In an embodiment of the present disclosure, in response to the output of the second video and the second sound, the first mobile 100 may detect a certain input. For example, if obscene contents are included in the second video and the second sound, the user of the first mobile 100 may take a certain body language action or make a certain sound. Otherwise, the user of the first mobile 100 may take a certain action on the first mobile 100.

In another embodiment, the first mobile 100 may detect a certain input from the received second video and second sound. If obscene contents are included in the second video and second sound, the first mobile 100 may detect the obscene contents, as the certain input. For example, the obscene contents may be a part that corresponds to a certain facial expression, body language, or body part, included in the second video. Otherwise, the obscene contents may be a part that corresponds to a certain voice or language, included in the second sound.

At step S340, in response to the report, the server 400 may mediate a video call between the first mobile 100 and the third mobile 300. More specifically, the server 400 may stop the video call session between the first mobile 100 and the second mobile 200, and establish a video call session between the first mobile 100 and the third mobile 300.

At step S350, the server 400 may verify the report, and reject additional mediation request of the second mobile 200 depending on the result of verification. More specifically, based on the captured image or video received from the first mobile 100, the server 400 may determine whether the second mobile 200 provided the video and sound that include the obscene contents. In addition, depending on the result of determination, the server 400 may not provide additional video call service to the second mobile 200.

As described with reference to FIGS. 1 to 8, the mobile and server according to an embodiment of the present disclosure may prevent the user of the mobile from being exposed to an obscene video from the counterpart by automatically detecting and blocking obscene contents from the video and sound received from the mobile of the counterpart. Otherwise, the mobile and server may prevent the user having a video call with the counterpart from feeling sexual shame or discomfort due to the video from the counterpart. Otherwise, the mobile and server may induce healthy video calls between the users.

The embodiments described above may also be implemented in the form of a record medium that includes instructions executable by a computer such as program modules executable by a computer. The computer readable medium may be any available media that can be accessed by a computer, and may include both volatile and nonvolatile media, and removable and non-removable media.

Further, the computer readable medium may include a computer storage medium or a communication medium. The computer storage medium may include both volatile and nonvolatile, and removable and non-removable medium implemented in any method or technology for storage of information such as computer readable instructions, data structures, program modules or other data. Communication media typically include computer readable instructions, data structures, program modules, or other data in a modulated data signal, such as a carrier wave, or other output mechanism, and may include any information delivery media.

Embodiments of the present disclosure were explained with reference to the drawings attached hereto, but a person skilled in the art will understand that the present disclosure may be implemented in other specific forms without changing its technical idea or essential characteristics. Therefore, the embodiments disclosed hereinabove must be understood as exemplary and not limiting the present disclosure in all aspects.

What is claimed is:

1. An operating method of a first mobile, the method comprising:
   receiving, by the first mobile, information of connection to a second mobile, from a server;
   establishing, by the first mobile, a video call session with the second mobile, using the received information of connection;
   receiving, by the first mobile, a video, from the second mobile, through the video call session;
   outputting, by the first mobile, the received video;
   detecting, by the first mobile, a certain input based on at least one of a certain video and a certain sound, wherein the certain input corresponds to a reaction of a user of the first mobile to the output video;
   when the certain input suggests a negative response from the user, analyzing, by the first mobile, the received video for obscene content; and
   when obscene content is present in the received video:
      reporting, by the first mobile, the received video to the server, in response to the analysis and the certain input based on at least one of the certain video and the certain sound;
      receiving, by the first mobile, information of connection to a third mobile that is different from the second mobile, from the server, in response to the reporting; and
      ending, by the first mobile, the video call session, and establishing, by the first mobile, a video call session with the third mobile using the received information of connection to the third mobile.

2. The operating method of the mobile, according to claim 1, wherein the detecting of the certain input, by the first mobile, further comprises detecting, by the first mobile, a certain manipulation on the first mobile, as the certain input.

3. The operating method of the mobile, according to claim 2, wherein the detecting of the certain manipulation, by the first mobile, involves detecting, by the first mobile, at least one of a manipulation of throwing the first mobile, a manipulation of dropping the first mobile, a manipulation of turning the first mobile over, a manipulation of shaking the first mobile, a manipulation of covering a display of the first mobile, a manipulation of repeatedly pressing a button of the first mobile, and a manipulation of repeatedly inputting a touch gesture into the first mobile, as the certain manipulation.

4. The operating method of the mobile, according to claim 1, wherein the detecting of the certain input, by the first mobile, comprises:
   photographing, by the first mobile, a video of surroundings of the first mobile; and
   detecting, by the first mobile, at least one of a part that corresponds to a certain facial expression, body language, and body part, from the photographed video, as the certain input of the first mobile.

5. The operating method of the mobile, according to claim 4, wherein the detecting of at least one of the part that corresponds to the certain facial expression, body language, and body part, by the first mobile, involves detecting, by the first mobile, at least one of the part that corresponds to a frowning facial expression, alarmed facial expression, dilated pupils, gesture to avoid gaze from the first mobile, gesture to cover eyes, and gesture to place a palm of a hand towards the first mobile, from the photographed video.

6. The operating method of the mobile, according to claim 1, wherein the detecting of the certain input, by the first mobile, comprises:
   recording, by the first mobile, a sound occurring from surroundings of the first mobile; and
   detecting, by the first mobile, a part that corresponds to at least one of a certain voice and language, from the recorded sound, as the certain input.

7. The operating method of the mobile, according to claim 6, wherein the detecting of the part that corresponds to at least one of the certain voice and the language, by the first mobile, involves detecting, by the first mobile, a part that corresponds to at least one of a scream and verbal abuse, from the recorded sound.

8. A non-transitory computer readable record medium, where a program for performing a method according to claim 1, is recorded.

9. The operating method of the mobile, according to claim 1, wherein the certain input comprises at least one of: a frowning facial expression, an alarmed expression, dilated pupils, a gesture to avoid gaze from the first mobile, a gesture to cover eyes, and a gesture to block the first mobile.

10. The operating method of the mobile, according to claim 1, wherein obscene content comprises at least one of insulting gestures, sexual material, illegal behavior, and unsanitary content.

11. A mobile, comprising:
a communication interface for receiving information of connection to a second mobile, from a server, establishing a video call session with the second mobile, using the received information of connection, and receiving a video from the second mobile, through the video call session;
an output interface for outputting the received video;
an input interface for detecting a certain input, based on at least one of a certain video and a certain sound, wherein the certain input corresponds to a reaction of a user of the second mobile to the output video; and
a processor for, when the certain input suggests a negative response from the user, analyzing the received video for obscene content,
wherein the communication interface, when obscene content is present in the received video:
reports the received video to the server, in response to the certain input based on at least one of the certain video and the certain sound,
receives information of connection to a third mobile that is different from the second mobile, from the server, in response to the reporting,
ends the video call session, in response to the receiving of the information of connection to the third mobile, and
establishes a video call session with the third mobile, using the received information of connection to the third mobile.

12. The mobile, according to claim 11, wherein the certain input comprises at least one of: a frowning facial expression, an alarmed expression, dilated pupils, a gesture to avoid gaze from the mobile, a gesture to cover eyes, and a gesture to block the mobile.

13. The mobile, according to claim 11, wherein the detecting of the certain input comprises:
photographing a video of surroundings of the mobile; and
detecting at least one of a part that corresponds to a certain facial expression, body language, and body part, from the photographed video, as the certain input of the mobile.

14. An operating method of a server, the method comprising:
receiving, by the server, a mediation request from a plurality of mobiles;
mediating, by the server, a video call connection between a first mobile and a second mobile, of the plurality of mobiles;
in response to a certain input, based on at least one of a certain video and a certain sound showing a negative reaction of a user of the first mobile to a video received from the second mobile and output, being detected by the first mobile, receiving, by the server, a report, from the first mobile, in response to the video received from the second mobile, based on the certain input and a detection of obscene content;
in response to the report, selecting, by the server, a third mobile that is different from the second mobile, of the plurality of mobiles, and mediating a video call between the first mobile and the third mobile; and
verifying, by the server, the report, and rejecting additional mediation requests of the second mobile, depending on a result of the verification.

15. The operating method of the server, according to claim 14, wherein the certain input comprises at least one of: a frowning facial expression, an alarmed expression, dilated pupils, a gesture to avoid gaze from the first mobile, a gesture to cover eyes, and a gesture to block the first mobile.

16. The operating method of the server, according to claim 14, wherein obscene content comprises at least one of insulting gestures, sexual material, illegal behavior, and unsanitary content.

17. A method, the method comprising:
receiving, by a server, a mediation request, from a plurality of mobiles;
mediating, by the server, a first mobile and a second mobile, of the plurality of mobiles;
establishing, by the first mobile and the second mobile, a video call session;
receiving, by the first mobile, a video from the second mobile, through the video call session;
outputting, by the first mobile, the received video;
detecting, by the first mobile, a certain input based on at least one of a certain video and a certain sound, wherein the certain input corresponds to a reaction of a user of the first mobile to the output video;
when the certain input suggests a negative response from the user, analyzing, by the first mobile, the received video for obscene content; and
when obscene content is present in the received video:
in response to the analysis and the certain input based on at least one of the certain video and the certain sound, reporting, by the first mobile, the received video to the server;
in response to the reporting, selecting, by the server, a third mobile that is different from the second mobile, of the plurality of mobiles, and mediating, by the server, the first mobile and the third mobile;
ending, by the first mobile, the video call session with the second mobile, and establishing, by the first mobile, a video call session with the third mobile; and
verifying, by the server, the report, and rejecting additional mediation request of the second mobile, depending on a result of the verification.

18. The method, according to claim 17, wherein the certain input comprises at least one of: a frowning facial expression, an alarmed expression, dilated pupils, a gesture to avoid gaze from the first mobile, a gesture to cover eyes, and a gesture to block the first mobile.

19. The method, according to claim 17, wherein obscene content comprises at least one of insulting gestures, sexual material, illegal behavior, and unsanitary content.

20. The method, according to claim 17, wherein detecting, by the first mobile, the certain input comprises:
photographing, by the first mobile, a video of surroundings of the first mobile; and
detecting, by the first mobile, at least one of a part that corresponds to a certain facial expression, body language, and body part, from the photographed video, as the certain input of the first mobile.

\* \* \* \* \*